United States Patent
Mukherjee et al.

(10) Patent No.: US 7,774,651 B2
(45) Date of Patent: *Aug. 10, 2010

(54) SYSTEM AND METHOD TO DETECT ERRORS AND PREDICT POTENTIAL FAILURES

(75) Inventors: Udayan Mukherjee, Beaverton, OR (US); Aniruddha Kundu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 180 days.

This patent is subject to a terminal disclaimer.

(21) Appl. No.: 11/970,029

(22) Filed: Jan. 7, 2008

(65) Prior Publication Data

US 2008/0104453 A1    May 1, 2008

Related U.S. Application Data

(63) Continuation of application No. 10/887,368, filed on Jul. 6, 2004, now Pat. No. 7,409,594.

(51) Int. Cl.
*G06F 11/00* (2006.01)

(52) U.S. Cl. .......................................... 714/26; 714/47

(58) Field of Classification Search .................. None
See application file for complete search history.

(56) References Cited

U.S. PATENT DOCUMENTS

| | | | |
|---|---|---|---|
| 4,866,712 | A | 9/1989 | Chao |
| 5,237,677 | A | 8/1993 | Hirosawa et al. |
| 5,293,323 | A | 3/1994 | Doskocil et al. |
| 5,500,940 | A | 3/1996 | Skeie |
| 5,596,712 | A | 1/1997 | Tsuyama et al. |
| 6,324,659 | B1 | 11/2001 | Pierro |
| 6,421,632 | B1 | 7/2002 | LeCorney |
| 6,510,393 | B1 | 1/2003 | Steinigke |
| 6,643,801 | B1 | 11/2003 | Jammu et al. |
| 6,651,190 | B1 | 11/2003 | Worley et al. |
| 6,947,797 | B2 | 9/2005 | Dean et al. |
| 2003/0208706 | A1 | 11/2003 | Roddy et al. |

OTHER PUBLICATIONS

D.C. Bossen et al., "Fault-Tolerant Design of the IBM p-Series 690 System using POWER4 Processor Technology", IBM Journal of Research and Development, IBM Corporation, New York, New York, USA, vol. 46, Jan. 2002, pp. 77-86.

P. Gonscherowski, "Sun Fire (TM) 6800/4810/3800 Auto Diagnosis and Recovery Features", Sun Blueprints, Apr. 2003, 14 pages.

*Primary Examiner*—Marc Duncan
(74) *Attorney, Agent, or Firm*—Trop, Pruner & Hu, P.C.

(57) ABSTRACT

A system is disclosed that includes a component, a fault table configured to receive fault information associated with the component, and a diagnosis processor configured to read the fault information from the fault table and initiate corrective action as a function of the fault information. A method for handling faults in the system is also disclosed.

17 Claims, 8 Drawing Sheets

SYSTEM AND METHOD TO DETECT ERRORS AND PREDICT POTENTIAL FAILURES

CROSS REFERENCE TO RELATED APPLICATIONS

This application is a continuation of U.S. application Ser. No. 10/887,368, filed on Jul. 6, 2004 now U.S. Pat. No. 7,409,594 by inventors Udayan Mukherjee et al., entitled "System and Method to Detect Errors and Predict Potential Failures", and priority is claimed thereto.

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND INFORMATION

In conventional computer systems, when a system fails, technicians may examine log files to diagnose the problem, after the problem occurs. Conventional fault-tolerant systems may include methods for diagnosing faults after a component fails, while preventing system failure from being caused by the component failure. For example, conventional fault-tolerant systems may include pair and spare systems, where two duplicated components run in lock step, receiving the same inputs. When the outputs from the pair of components differ, one of the components of the pair is known to have failed, although not which one, and both components are shut down and replaced by a spare, possibly without any human intervention. Alternatively, three components may be used that run in lock step, receiving the same inputs. When one of the outputs from the three components differs from the other two, the component that differs is considered to have failed, and may be replaced.

Redundancy and failover mechanisms may be employed which reduces downtime if a primary system fails. A system may be configured in an N+1 or N+i configuration with hot and/or cold standbys. If a primary system fails, the standby system becomes the primary. The amount of downtime caused by such an occurrence may depend on how quickly the system can be failed over to the standby and on how closely the standby was synchronized with the primary system which has failed. Currently, in telephone communication systems, it generally takes a few seconds to fail over a failed system and restore service after the failure is detected. The telephone communication OEMs (Original Equipment Manufacturers) are seeking lower downtime in their systems.

Individual components in a system may also be fault-tolerant. For example, error correcting codes may correct faults, which occur in a memory. When these faults are successfully corrected, they may be invisible to the system as a whole. When these faults continue to build up without being detected or corrected, a system failure may occur. System downtime may be needed for replacing the memory chip.

An increased frequency of correctable errors may suggest that an uncorrectable failure is imminent, or at least that the risk of such a failure has increased. Predicting component failures before they occur may reduce the chance of system failure and the resultant system downtime. Predicting component failures before they occur may also allow maintenance to be performed more efficiently.

Conventional fault handling systems are generally "reactive" in nature. In other words, after a fault happens, an alert is triggered, and fail over is achieved to a known good system, after which diagnosing the problem can begin. As the demand for more and more uptime increases for all applications like e-commerce, electronic trading, etc., the system design challenges becomes almost insurmountable with the reactive failover architectures. In a cost conscious environment when lockstep methods may not be cost justifiable, this reactive mode of fault handling is not sufficient to meet these requirements.

DETAILED DESCRIPTION

Figure 1:
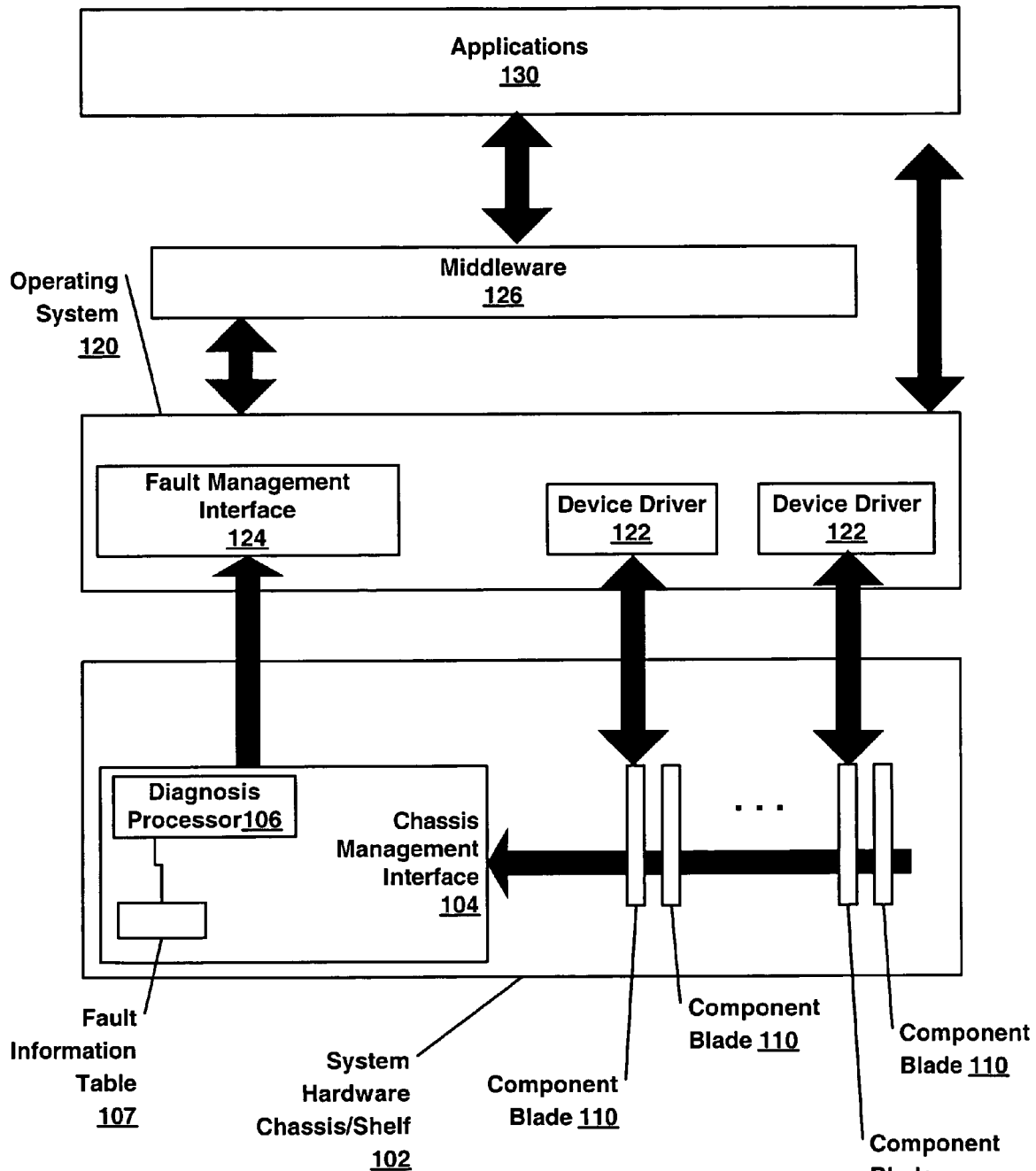
FIG. 1 illustrates a high-level diagram of an example system, according to an example embodiment of the present invention.

FIG. 1 illustrates a high-level diagram of an example system, according to an example embodiment of the present invention. The system may be a computer system, telecommunications switch, telecommunication transmission equipment, or for some other application. For example the system hardware may be a Chassis/Shelf based computer system based on Advanced TCA* or cPCI architecture used for hosting highly available telecommunication services and applications for both the wire-line and wireless industries. The system hardware chassis/shelf 102 may include a single chassis with multiple circuit cards or blades, for example a single chassis/shelf with multiple compute and access blades/boards/modules interconnected with a high speed fabric such as Ethernet, Infiniband or other standard serial fabric. However, it will be appreciated that other arrangements of hardware may be employed, for example the entire system may be on a single blade, or the system may include multiple interconnected chassis.

The system hardware 102 may include a chassis management module control blade 104. The control blade may also be termed a CMM or chassis management module and may act as a central control module for the system hardware 102, or alternatively for some subset of the hardware. The control blade 104 may be responsible for managing fault detection, diagnosis, and fault handling in the system hardware 102.

This chassis management module functionality can also be implemented as a "partitioned" part of a regular blade.

The control blade 104 may include a diagnosis processor 106. The diagnosis processor may be an IPMI BMC controller chip, or alternatively some other diagnosis processor or a general purpose processor programmed to function as a diagnosis processor. The control blade 104 and diagnosis processor 106 may receive fault information, e.g., fault data or other status information read from other components in the system. The flow of fault information from the components to the control blade 104 and the diagnosis processor 106 is illustrated by a solid arrow. The control blade 104 and diagnosis processor 106 may also control the configuration of other system hardware components. When a fault is detected, the control blade 104 and diagnosis process 106 and may send information to higher levels of the system, e.g., alert messages. The control blade 104 and diagnosis processor 106 may maintain a set of master key "fault" information databases for all the key shelf components over time and trigger action based on fault detection algorithms that may be stored as firmware. The control blade 104 and diagnosis processor 106 may also initiate other forms of corrective actions, including launching appropriate diagnostic procedures such as BIST (Built In Self Test) functions in system components, disabling components, replacing components with spares (either automatically or with human intervention), and working with higher level system functions to reallocate memory usage, storage, or files, etc. The initiated corrective actions may be performed by the diagnosis processor, or by other system elements based on a predefined policy set by the system administrator.

The system may include a fault information table 107, which may be used to store a master fault information table. The fault information table 107 may be part of the diagnosis processor 106, or may be a separate component accessible by the diagnosis processor 106. The fault information table 107 is configured to allow storage of fault information received from other system components. Fault information in the fault information table 107 may be associated with a particular component or type of component. Alternatively information associated with all component types may be included. The fault information table 107 may also be configured to allow the diagnosis processor 106 to access the fault information. Using the information from the fault information table 107, the diagnosis processor 106 may be configured to predict the failures of individual system components before they occur, and take appropriate corrective action, e.g., running internal diagnosis procedures, disabling components, replacing the components with spares, triggering system alerts, etc.

Other functions of the chassis management blade or module (CMM) 104 may include control and management of the chassis or shelf as a whole, including support devices and environment. For example, the chassis management blade may monitor temperature, the operating state of fans or other cooling devices, the operating state of power sources including batteries or a UPS (uninterrupted power supply) system, etc. The chassis management blade 104 may also control cooling devices and power sources, e.g., by increasing the operating rate of a fan if another fan fails or if temperature rises above a threshold.

The example system may include a number of general purpose component blades 110. These component blades may include compute or processing, storage, I/O, and other functional components, or some subset of these. The component blades 110 may be used to provide the functionality desired by users from the system. For example, the component blades 110 may include line blades in a piece of telecommunications transmission equipment, processor blades in a multiprocessor, switching fabric blades in a telecommunications switch, disk drive or other device I/O controllers, or other types of conventional hardware system components. In this example, a compute blade, a storage blade, and an I/O blade are provided. Other types of special purpose blades may also be included. Some may provide several of these functionalities in one blade.

The system may also have an operating system 120. For example, the operating system 120 may be an open source LINUX operating system optimized for telecommunications applications. Other conventional operating systems may also be used. It will also be appreciated that the system may have multiple operating systems, e.g., a separate operating system on each blade of the system. The operating system 120 may include one or more device drivers 122, which may provide an interface between the operating system 120 and hardware components 110 of the system. The transmission of data between the operating device driver 122 and components 110 is illustrated in FIG. 1 by a double connecting arrow.

The operating system 120 may also include a fault management interface 124. The fault management interface 124 may allow the transmission of information about faults and corrective actions between the control blade 104 and the operating system 120. The fault management interface 124 may also provide a standard interface for fault monitoring and maintenance.

The operating system may also include middleware 126, which may be used to provide various standard interfaces to user applications, e.g., network management and control systems.

The system may also include applications 130. These applications may communicate with the operating system 120 directly, or via the middleware interfaces 126. Applications may include network and system management tools, operations and maintenance systems, and other applications. These applications may run directly on the system hardware 102, or may interface with the system from a remote location. It will be appreciated that other channels may also be provided to allow applications 130 to communicate directly with the control blade 104 and diagnosis processor 106, without passing through the operating system. Such channels may allow remote monitoring of system hardware.

Figure 2:
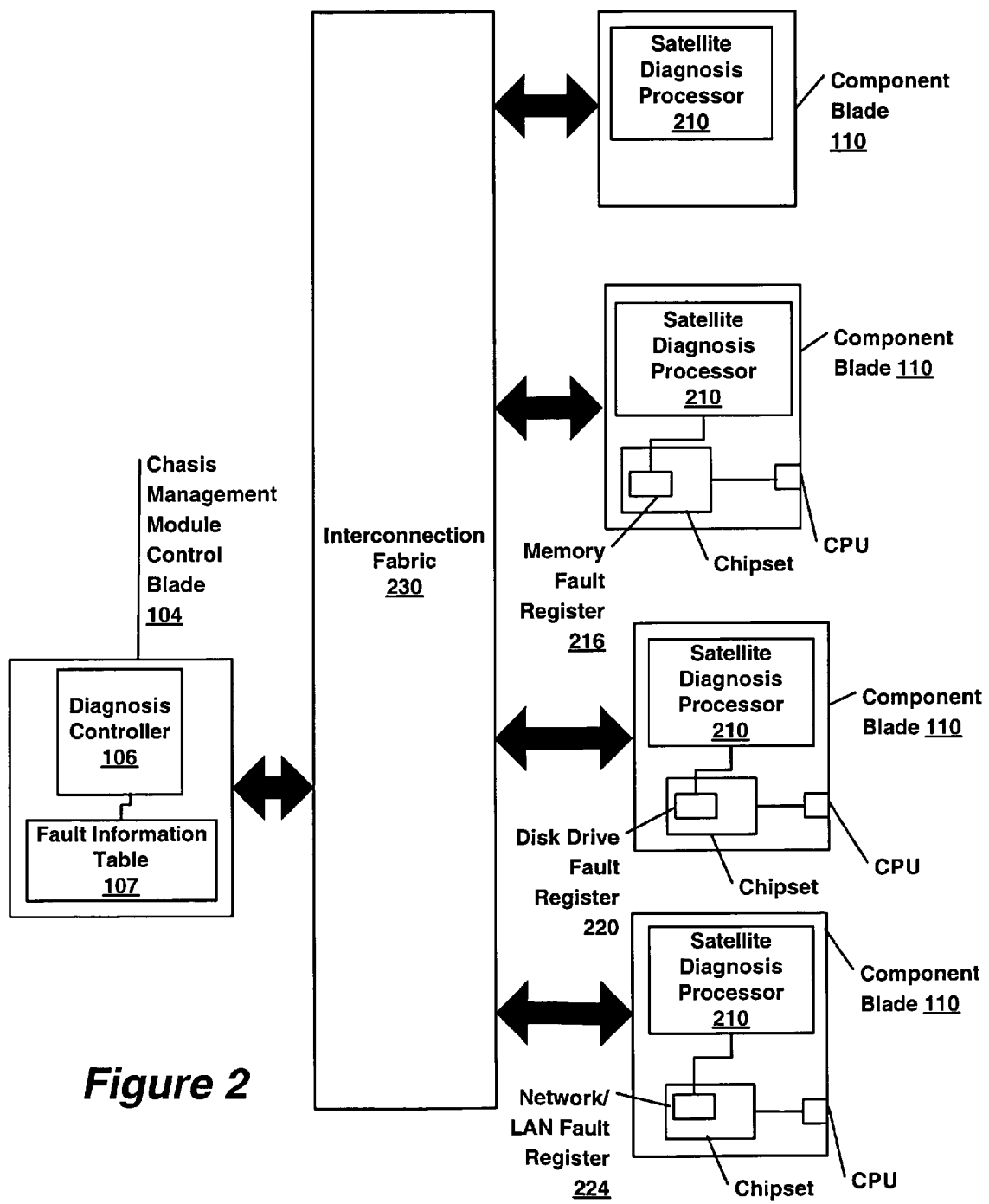
FIG. 2 illustrates an example hardware layout for an example system, according to an example embodiment of the present invention.

FIG. 2 illustrates an example hardware layout for an example system, according to an example embodiment of the present invention.

The example system may include a control blade 104, which includes a diagnosis processor 106 and a fault information table 107. The fault information table 107 may be stored on the diagnosis processor 106, or in some other location accessible to the diagnosis processor 106. The control blade 104 may collect and preprocess chassis fault data. Chassis fault data may include environmental information such as temperature and fan operating state, humidity, etc. Chassis fault data may also include power operating state such as availability and quality of line power, UPS operating state, battery power levels, etc. The chassis control blade may also receive fault data from other system components, including data from other diagnosis processors located on these components, as detailed below.

The example system may include various component blades 110. These component blades may include line blades in a piece of telecommunications transmission equipment, processor blades in a multiprocessor, switching fabric blades in a telecommunications switch, disk drive or other device I/O controllers, or other types of conventional hardware system components. Referring to FIG. 2, each component blade may include a satellite diagnosis processor 210. The satellite diagnosis processor 210 may be a separate component, or may be provided as a logical entity, e.g., as part of another processor or chipset. The satellite diagnosis processor 210 on a component blade 110 may gather fault data from components on the component blade 110. This information may be gathered directly from components, or from a component fault information table or register (e.g., memory fault register 216), which may be part of the component chipsets. Information gathered from the component fault register 216 may be stored in the satellite diagnosis processor 210 or in some other location accessible to the satellite diagnosis processor 210.

Component blades may also be specialized, e.g., compute, I/O, or storage blades.

A component blade 110 may include one or more processors or CPUs, as well as memory, and other computing components. Each component 110 may include a satellite diagnosis processor 210. The satellite diagnosis processor 210 may be a separate component, or may be provided as a logical entity, e.g., as part of the CPU chipset. The satellite diagnosis processor 210 on a component blade 110 may gather fault data from processor and other components on the component blade 110. This information may also be gathered from memory fault register 216, which may be part of the chipset. Information gathered from the component fault register 216 may be stored in the satellite diagnosis processor 210, or in some other location accessible to the satellite diagnosis processor 210.

A storage component blade may include one or more disk controllers or storage CPU, as well as memory, and other computing components. The satellite diagnosis processor 210 may be a separate component, or may be provided as a logical entity, e.g., as part of the disk controller chipset. The satellite diagnosis processor 210 on a storage component blade may gather fault data from disk controllers and other components on the storage component blade. This information may be gathered from disk drive fault information table or register 220, which may be part of the disk controller chip set. Information gathered from the disk drive fault register 220 may be stored in the satellite diagnosis processor 210 or in some other location accessible to the satellite diagnosis processor 210.

A network/LAN blade may include one or more I/O CPUs, as well as other components. Each network/LAN blade may include a satellite diagnosis processor 210. The satellite diagnosis processor 210 may be a separate component, or may be provided as a logical entity, e.g., as part of the network processor chipset. The satellite diagnosis processor 210 on a network/LAN blade may gather fault data components on the network/LAN blade. This information may be gathered from network/LAN fault information table or register 224, which may be part of the network/LAN processor chipset. Information gathered from the network/LAN fault register 224 may be stored in the satellite diagnosis processor 210 or in some other location accessible to the satellite diagnosis processor 210.

It will be appreciated that blades may include components of different types, rather than just compute, network/LAN, or storage elements. Memory fault registers, disk drive fault registers and processor fault registers may be implemented as part of a fault management chipset and included as part of the component fault table. So in each blade or computing blade, the interaction may be from the main CPU of the blade to the fault management chipset to the diagnosis processor on the control blade. The chipset and/or the diagnosis processor may also maintain the master device fault information table for the blade and pre-process fault information, e.g., by aging, thresholding, or filtering it, before sending summary fault information to a master fault information table on the control blade 104. The satellite diagnosis processors 210 may be configured to monitor all or part of these component blade elements on each component blade, as well as other component blade devices not shown, e.g., communication ports, power supplies, network interface devices, etc.

The satellite diagnosis processor 210 may be configured to preprocess the collected fault data, e.g., associating a time value indicating when the data was collected with the collected fault data, reducing multiple identical fault detections in an interval to a single reported event that includes a count of the number of detections, deleting or ignoring certain types of faults, etc. It will be appreciated that, depending on the system architecture, the fault data collection and/or pre-processing could alternatively be performed directly by the diagnosis controller 106.

The system may include an interconnection fabric 230. It will be appreciated that the interconnection fabric 230 may be the main system bus, a management bus, or may be a special bus dedicated to the transmission of fault information and control of the system fault tolerance features. The fabric 230 may be a "Fabric" based on Ethernet or some other standard serial high speed connection, or it may be a special bus dedicated to the transmission of fault information or control like IPM. It will also be appreciated that other forms of communications between the blades in the system may also be employed, e.g., multiple buses or other networking architectures may be employed. Once a satellite diagnosis processor 210 collects and preprocesses fault data from a component, the information may be forwarded to the control blade 104 via the interconnection fabric 230. It will also be appreciated that the interconnection fabric 230 may be a regular data bus, or may be a special bus added solely to exchange fault information and fault handling instructions. Once the fault information is received, it may be stored in the fault information table 107, e.g., by the diagnosis processor. The satellite diagnosis processor 210 may also have the ability to write the fault information directly to the fault information table 107.

When a component failure occurs, the diagnosis processor 106 may receive information about the failure from the corresponding satellite diagnosis processor 210, e.g., by receiving a message, or by reading an entry in the fault information table. As in a conventional fault-tolerant system, the diagnosis processor 210 may cause the system to take appropriate corrective action, e.g., disabling the component, generating an alert to the operating system, or replacing the component by a spare component. The diagnosis processor 106 may also be configured to use fault information collected from the components to predict component failures and take corrective action before component failures occur, e.g., executing a diagnostic procedure, replacing the component by a spare before the component fails, working with the operating system to rearrange storage to avoid a faulty memory or disk, etc.

Figure 3:
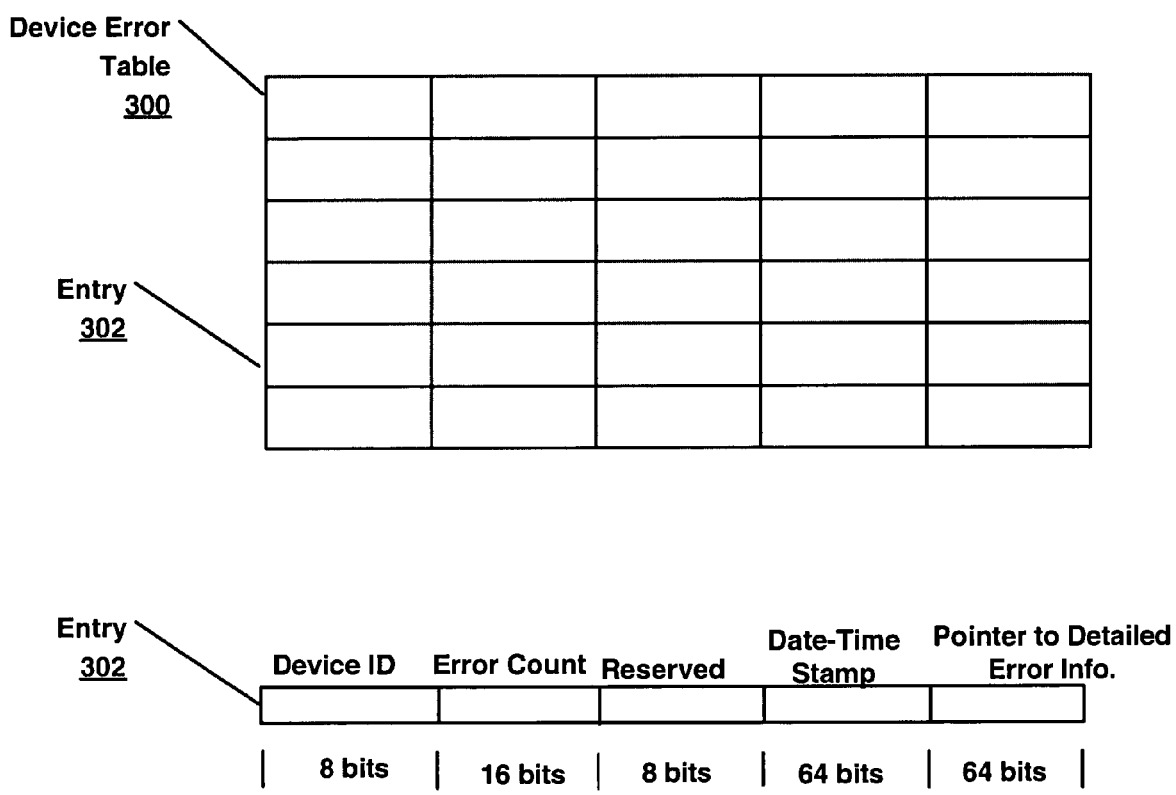
FIG. 3 illustrates an example device error table and entry, according to an example embodiment of the present invention.

FIG. 3 illustrates an example of a device error table 300, according to an example embodiment of the present invention. The example device error table 300 may be included as part of the diagnosis processor 106. Alternatively, the device error table 300 may be included in another location in the system where the device error table is accessible to the diagnosis processor 106, e.g., as a separate chip on the control board 104. Although the device error table 300 has been illustrated as a hardware component, the table may be stored in dedicated hardware components, or as part of a software or firmware table. It will also be appreciated that, although the device error table is shown as an array, other data structures may be employed for the device error table, e.g., a linked list, hash tables, etc. It will also be appreciated that multiple device error tables may be included in the system, e.g., one for each particular class of components.

The device error table 300 may include one or more entries 302. One entry may be included for each component in the system. Alternatively, multiple entries may be included, e.g., one for each fault or type of fault that has been detected in a given component.

Referring to FIG. 3, an example entry in an example device error table, according to an example embodiment of the present invention. The example entry 302 may include several fields.

The example entry may include a device ID field. The device ID field may identify a component for which the particular entry 302 contains fault information. For example, the device ID field may indicate a particular memory page in a blade or particular disk drive. It will be appreciated that other approaches to linking the device error table entries and the components may be used, for example an entry for a memory may include a particular memory address or page address, while an entry for a disk drive may include track and sector information. Alternatively, the device ID field may include a pointer to a data structure containing information about a particular component.

The example entry 302 may include an error count field that indicates the number of times the error has occurred in the relevant time window (as described below). The entry 302 may include a date-time stamp field, which may be indicative of when a fault was detected in the component identified by the device ID field. Depending on the failure prediction algorithms employed, it will be appreciated that the value in the date-time stamp field may only need to be approximate. It will also be appreciated that the date-time stamp value may be in different formats. For example, this field may contain a real time value such as the system clock time when the fault was detected, or alternatively a counter or timer that indicates the amount of time that has elapsed since the fault was detected.

Figure 4:
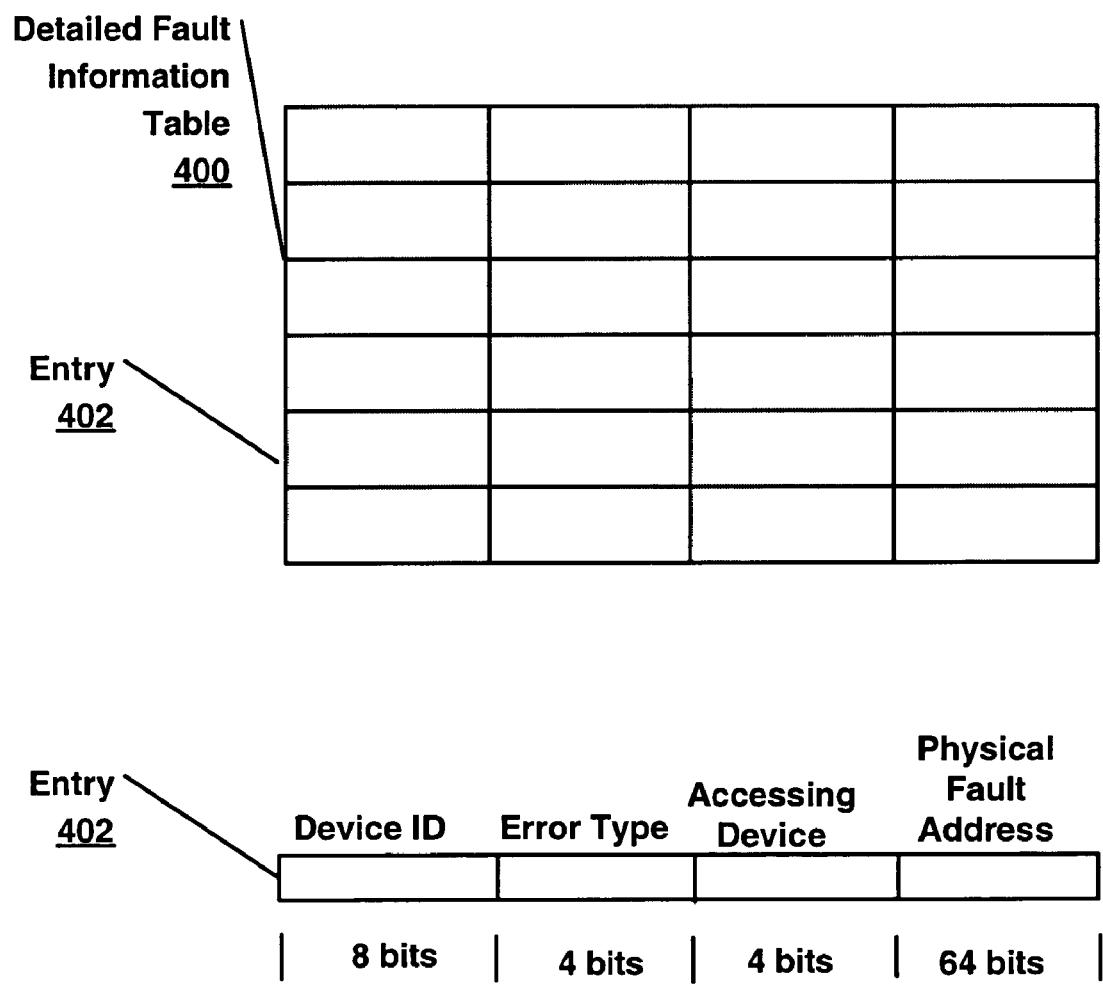
FIG. 4 illustrates an example detailed fault information table and entry according to an example embodiment of the present invention.

The example entry 302 may also include a pointer field (e.g., a pointer to detailed error information). The pointer may point to an entry in a detailed fault information table (e.g., as shown in FIG. 4). Each entry in the detailed fault information table may be a data structure that indicates the nature of the fault or error message that was detected. Such a data structure may include the severity of the fault, how the fault was detected, and the particular nature of the fault that was detected, e.g., a successfully corrected one bit error in a particular memory location. If the device ID field only indicates a high-level component, such as a board, the detailed error information may provide information on fault location. For example, if the device ID field indicates a particular disk drive, the data structure referenced by the pointer may include track and sector information.

It will be appreciated that the fields in the device error table 302 need not be single variables or memory locations, e.g., the device error table fields may include links or pointers to a more complicated data structures, or may directly include more complicated data structures.

An example embodiment of the present invention for a detailed fault information table 400 stored in the chipset of each component blade is shown in FIG. 4. Each main system board may gather fault data, parse this fault data and take action if a threshold fault level is crossed. In addition, each main system board may send summary fault information and alert detail to the chassis management modules diagnostic management system, which stored this information in the detailed fault information table. The chassis or shelf management system may send information to a centralized fault management system.

Diagnostic access procedures may be provided that access the detailed fault information table, analyze information contained therein and take appropriate action. These actions may include sending alerts to the operating system and launching appropriate diagnostics, which may be stored in firmware. These diagnostics may further analyze the fault data and may possibly correct the problem. Data on individual system components like memory, hard disk drives, and each blade or circuit pack in the system from chipsets located in the respective components that collect and generate fault information. These actions may also include initiation of graceful failover of the application out of the potentially faulty segment (memory, disk, network framers, compute processor or other elements) before running corrective action or analyzing diagnostics.

It will be appreciated that various detailed fault information tables in the system may be stored in different ways and may include different information depending on the particular implementation. For example, detailed fault information may be stored in the diagnosis processors, or in separate locations accessible to the diagnosis processors. Detailed fault information may be stored originally in fault registers in the chipsets associated with various types of components. These registers may serve as the most detailed fault information. Information from these detailed tables may be parsed by satellite diagnosis processors, aged, filtered, and stored in intermediate fault information tables or master device fault information tables associated with satellite diagnosis processors. These master device fault information tables may be stored in the satellite diagnosis processors, or some other location accessible to these processors. Processed fault information from the satellite diagnosis processors and master device tables may then be forwarded to a system or chassis level diagnosis processor, where it may be stored in a master fault information table for the entire chassis, shelf, or system. More detailed examples of the device error table and detailed fault information table are described below.

FIG. 4 illustrates an example entry 402 in an example detailed fault information table, according to an example embodiment of the present invention. It will be appreciated that the table may be implemented using different data structures, e.g., linked lists, objects, arrays, etc.

The example detailed fault information table entry 402 may include a device ID field. The ID field typically is similar to the ID field of the device error table entry of FIG. 3. The example detailed fault information table entry 401 may include an error type field to indicate the type of error that occurred. For example, if the device is a memory device, the error type field may indicate whether the error was a write error, a read error, etc.

The example detailed fault information table entry may include an accessing device field identifying the device that was accessing the one where the error occurred. Also, the detailed fault information table may include a physical fault address field identifying the address that was being accessed at the time of the error. Though not shown in FIG. 4, other fields may be included in the detailed fault information table such as fields that record system environment measurements when the fault was detected, for example temperature, voltage, and fan operating state. Also, the fault information table entry may include a flags field, which may contain information on error or alert flags that have been triggered.

As stated above, each device has an associated device error table and a detailed fault information table. The type of data stored in these tables may be device-specific. For a hard disk drive, the detailed fault information table entry may include an error type field that identifies the type of an error detected in the device based on the type of access, e.g., read, write, or read/write that was being made to the device when the error was detected. The physical fault address field may include the address on the hard disk drive that was being access when the error was detected.

For a memory device, the detailed fault information table entry may include a field identifying a memory page address, which may indicate an address at which a memory fault was corrected. The table entry may include an error-type field that describes the type of error or fault detected, e.g., a single bit parity error, a protection violation, double bit error etc. The accessing device field may include information about the accessing program when the fault was detected, e.g., a process ID, a DMA device or another bus mastering device or other identifier.

For a network/LAN device, the detailed fault information table entry may include a field identifying a particular I/O port where the error occurred, and a field indicating an address at which a fault was detected, e.g., a particular port or line. Also, a field may be provided that describes the type of error or fault detected, e.g., no carrier, a fault in the i/o processor, errors from various network protocols, link error etc.

It will be appreciated that the detailed fault information tables may take other forms, or may include information from multiple different types of components.

Figure 5:
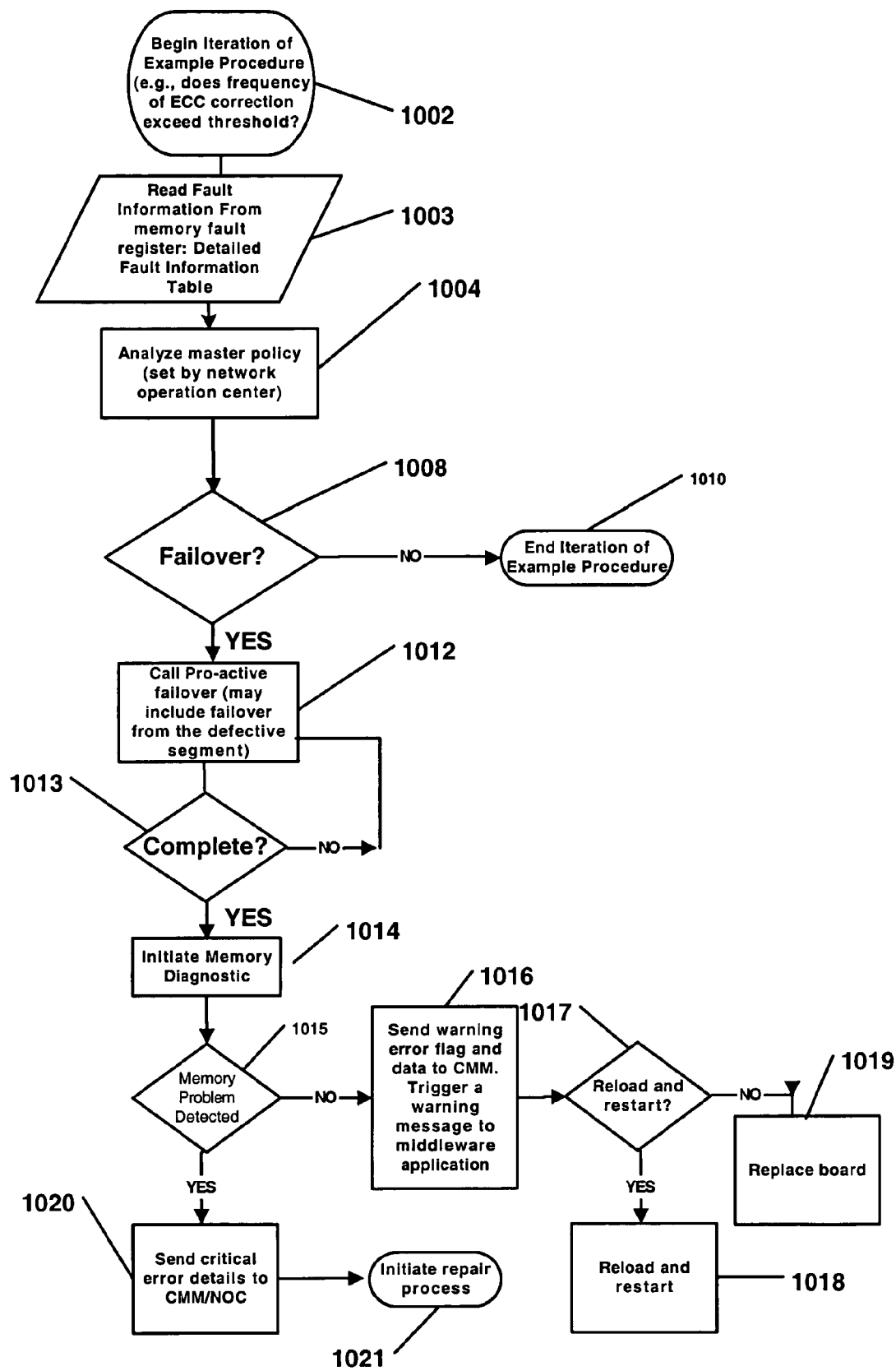
FIG. 5 illustrates an example procedure for fault diagnosis and prediction for a memory component, according to an example embodiment of the present invention.

FIG. 5 illustrates an example procedure for fault diagnosis and prediction for a memory component, according to an example embodiment of the present invention. The example procedure is described in terms of memory fault analysis, but other component types may be controlled using similar procedures. The example procedure may be executed by the diagnosis processor, the satellite diagnosis processor, both processors in combination, or by some other system element. It will be appreciated that the example procedure may be carried out by executing a series of instructions stored on a computer-readable medium. The series of instructions may be stored on CD-ROM, disk, tape, as microcode or in firmware, or any other computer-readable medium.

An iteration of the example procedure begins with 1002. The example procedure may be executed periodically, e.g., at regular time intervals, or may be event triggered, e.g., run when a fault-related interrupt occurs during a memory read or write, or when a parity error is detected. It will be appreciated that the frequency of execution may be varied as a function of the state of the system, e.g., reduced with increasing work load, or increased when more faults have been detected. It will be appreciated that the example procedure may also be setup so as to be triggered when a particular type of self correcting fault reaches a threshold.

In 1003, fault data from a detailed fault information table may be read, e.g., by a satellite diagnosis processor from a memory or CPU chipset fault register. It will be appreciated that, depending on the particular hardware implementation employed, fault data may also be read directly by the diagnosis processor from a faulty component. Fault data may also be gathered indirectly, rather than gathered directly from component, e.g., by logging operating system error messages or interrupts. It will be appreciated that correlating different types of error messages by time, or by possible source, may be advantageous.

In 1004, the satellite diagnosis processor may analyze a master policy (e.g., one set by a network operation center (NOC)) to determine whether the error warrants a failover action to take place. The fault information may be fault data preprocessed by a satellite diagnosis processor, or may be recorded directly, e.g., in a log file form. The fault information may include a memory address or page address where the fault occurred, a time, and a fault type. The fault type information may include the severity of the fault, how it was detected, and the particular nature of the fault that was detected, e.g., a successfully corrected parity error in a particular memory location.

In 1008, it is determined whether a failover for the device causing the error should occur. For example, the number and nature of the faults may be examined to predict the likelihood of component failure. If a component has had more than a predetermined number of faults in total or more than a predetermined number of faults in a given time interval (as may have been read from the master policy in 1004), then corrective action may need to be taken, and the example procedure continues to 1012. Otherwise, the procedure continues with 1010. It will be appreciated that different thresholds may be used for different fault types, e.g., corrected parity errors may have a relatively high threshold, while total hard failures of an entire component may be acted upon as soon as they are detected. The thresholds may vary depending on the state of the system, workload, etc.

In 1010, no failover takes place, and the iteration of the example procedure may end. The example procedure may be iterative, periodically checking, in which case 1010 only represents the end of an iteration, not the entire procedure.

In 1012, a pro-active failover may be called, and when that operation is complete (decision block 1013), control pass to block 1014 to initiate a memory diagnostic procedure. For example, if the memory has a Built-In Self Test (BIST) capability, an execution of the BIST function may be triggered. Other testing or diagnostic procedures may also be employed, e.g., a memory audit or scrub by the operating system may be triggered, or time redundancy techniques might be employed such as executing a recovery block or re-executing a process from a checkpoint.

In 1015 it is determined whether a memory problem has been detected. If a memory problem has not been detected, control passes to block 1016 and a warning error flag and data is sent to the control module CMM. A warning message to a middleware application is also triggered. Control passes to decision block 1017 to determine whether the device should be reloaded and restarted (as in block 1018). If it is not, then control passes to block 1019 where the board is replaced.

If a memory problem has been detected in decision block 1015, then control passes to block 1020. In this case, the example procedure has identified a problem or potential failure in the memory, or at least a higher likelihood of a failure occurring. The example procedure may initiate various types of corrective action. For example a critical error alert may be sent to the CMM and NOC indicating the nature of the problem. In 1021, the example procedure may end after a repair process has been initiated.

Figure 6:
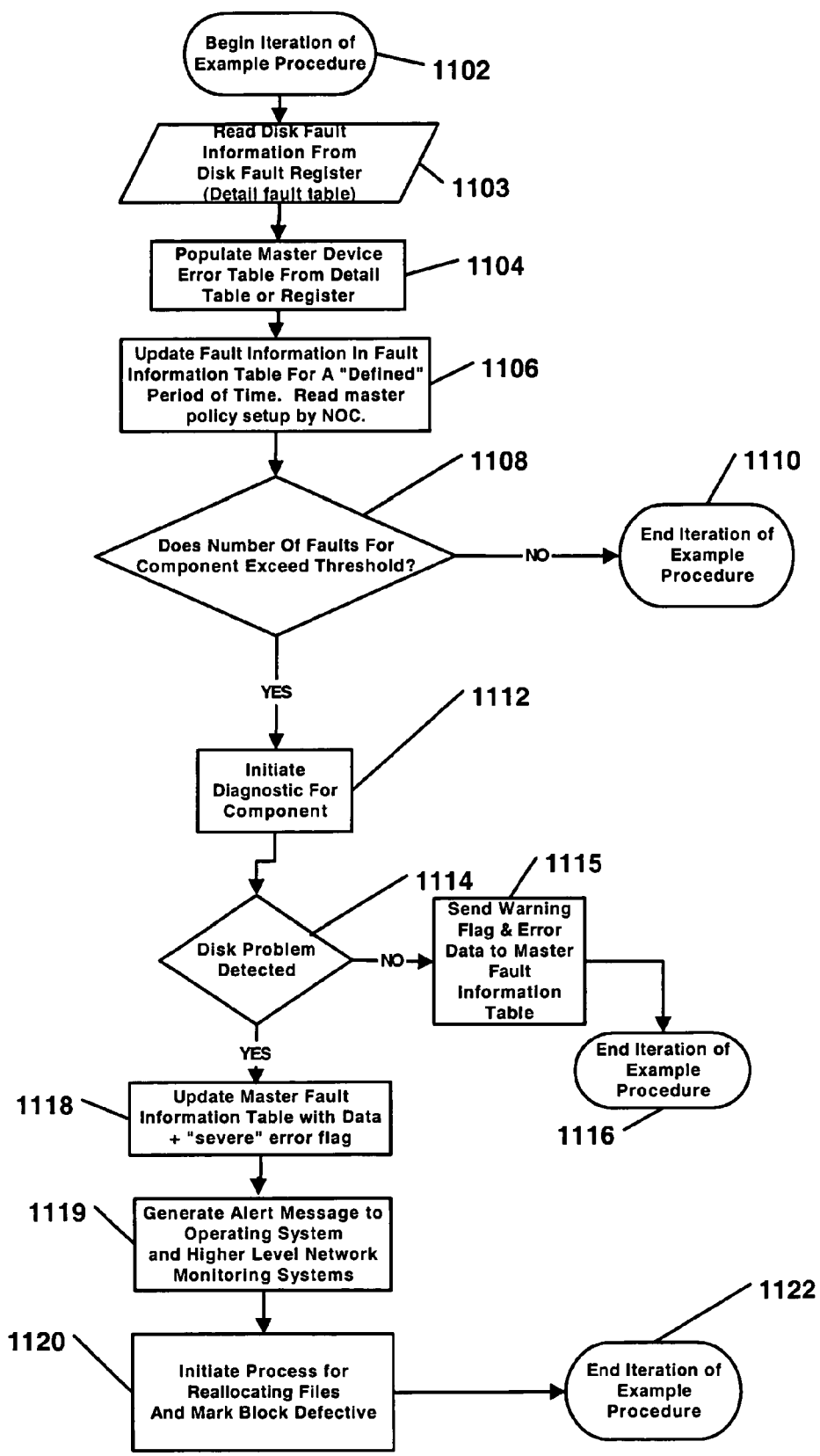
FIG. 6 illustrates an example procedure for fault diagnosis and prediction for a disk component, according to an example embodiment of the present invention.

FIG. 6 illustrates an example procedure for fault diagnosis and prediction for a disk component, according to an example embodiment of the present invention. The example procedure is illustrated in terms of disk fault analysis, but it will be appreciated that other component types could have similar procedures. The example procedure may be executed by the diagnosis processor, the satellite diagnosis processor, both processors in combination, or by some other system element. It will be appreciated that the example procedure may be carried out by executing a series of instructions stored on a computer-readable medium. The series of instructions may be stored on CD-ROM, disk, tape, as microcode or in firmware, or any other computer-readable medium.

An iteration of the example procedure begins with 1102. The example procedure may be executed periodically, e.g., at regular time intervals, or may be event triggered, e.g., when a fault-related interrupt occurs during a disk read or write. It will be appreciated that the frequency of execution may be varied as a function of the state of the system, e.g., reduced with increasing work load, or increased when more faults have been detected.

In 1103, fault data from a disk may be read, e.g., by a satellite diagnosis processor located on the same blade with the disk controller. The data may be read from the disk fault register or other form of fault detail table. It will be appreciated that, depending on the particular hardware implementation employed, fault data may also be read directly by the diagnosis processor from a faulty component, or obtained indirectly, e.g., from the operating system.

In 1104, the satellite diagnosis processor will update the master device fault table with information about the fault. The fault information may be fault data preprocessed by a satellite diagnosis processor, or may be raw fault data recorded directly, e.g., in a log file form.

In 1106, the satellite processor may age or filter the data in the master device table, e.g., by deleting entries of greater than a certain age, collapsing related faults, or other forms of processing.

Also in 1106, the procedure reads the master policy (if any) that was setup by network Control Center (NOC) for policy on threshold and failover.

In 1108, the number of faults and nature of the faults may be examined to predict the likelihood of component failure. If a component has had more than a predetermined number of faults in total or more than a predetermined number of faults in a given time interval or window, then corrective action may need to be taken, and the example procedure may continue with 1112. Otherwise, the procedure may continue with 1110. The particular corrective action may depend on the number and type of faults recorded in the fault information table. For example, localized faults may only result in marking certain disk sectors as bad. Greater numbers of faults across a wider area may indicate a problem with the entire disk drive.

In 1110, no disk drive failure is predicted, and the iteration of the example procedure may end. The example procedure may be iterative, periodically checking, in which case 1110 only represents the end of an iteration, not the entire procedure.

In 1112, a disk drive diagnostic procedure may be initiated. For example, if the disk drive controller has a BIST capability, an execution of the BIST function may be triggered. Programs may also be initiated to scan the disk, or to compare a disks contents with a second disk that serves as a mirror.

In 1114 the results of diagnostic procedures may be evaluated. If a problem has been detected, or failure seems likely, the example procedure may continue with 1118. Otherwise, the example procedure may continue in 1115.

In 1115, the diagnostic procedure has not detected that a failure is likely. A warning flag and error data may be sent to the master fault information table on the control blade. Warnings or error flags may also be sent to other locations, e.g., to the operating system or other management systems monitoring the system. The iteration of the example procedure may end. The example procedure may be iterative, periodically checking, in which case 1110 only represents the end of an iteration, not the entire procedure. It will be appreciated that the fault information may still be updated, so that if a particular disk drive continues to cause problems, it may be flagged for service or replacement, even if no failure is predicted or detected.

When 1118 has been reached, the example procedure has discovered a potential failure in the disk drive, or at least determined an increased likelihood of a failure occurring. The master fault information table may be updated with fault information that contains a "severe" error flag. The example procedure may include various types of corrective action. For example, in 1119, an alert may be sent to the operating system, indicating the nature of the problem. In 1120, a process for reallocating files away from a faulty drive or disk block may be initiated. A faulty block may be marked defective to prevent its use. The faulty disk drive (or faulty block) may be disabled. A faulty disk drive may be replaced by a spare, if the system has a dynamic reconfiguration capability or is mirrored. Alternatively, the operating system may be configured to prevent access to the particular disk drive or disk page. Files may be copied from the drive to other drives. Other forms of corrective action may also be taken. For example a user process that is potentially corrupted by data from a bad disk block may be terminated or rolled back to a checkpoint.

In 1122, the example procedure may end after the corrective action has been taken. The example procedure may be iterative, periodically checking, in which case 1122 only represents the end of an iteration, not the entire procedure. It will be appreciated that the fault information may still be updated, so that if a particular disk drive continues to cause problems, it may be flagged and replaced, even failures have only been detected in certain segments or tracks.

ALTERNATIVE EXAMPLE EMBODIMENT

Figure 7:
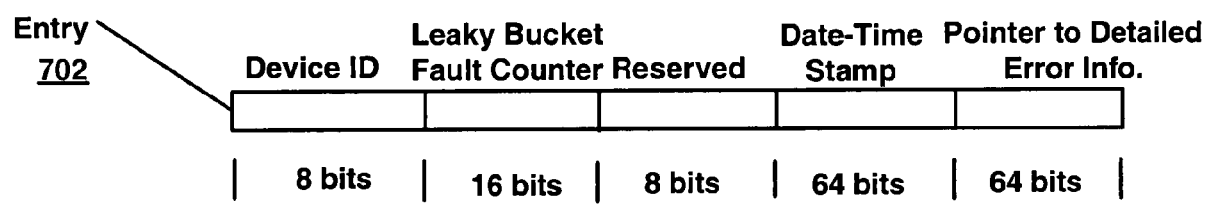
FIG. 7 illustrates an example device error table entry, in a second example embodiment according to the present invention.

In an alternative example embodiment according to the present invention, the device error table entry 702 (FIG. 7) may include several fields.

The device error table entry 702 may include a device identification field.

The device error table entry 702 may also include a leaky bucket fault counter. The leaky bucket fault counter may be configured to track whether too many faults have occurred in a predetermined time interval or window, resulting in a need to take corrective action for the component identified in the device identification field. For example, each time a fault is detected the counter may be incremented.

Periodically, the counter may be reduced, e.g., to age the fault information. In one embodiment, if the frequency of faults or errors decreases, the time window for the error count can be increased. Also, if the frequency of faults or errors increases, the time window for the error count can be decreased. If the counter exceeds a threshold, it may be concluded that a problem has occurred and corrective action needs to be taken. The threshold and rate of reduction may be tuned to achieve desired fault detection performance properties.

The example device error table entry 702 may also include a date-time stamp field and a pointer to detailed error information. The pointer field may point to data about the type of fault last detected, or other information that may be collected which may be useful in fault diagnosis and corrective action.

Figure 8:
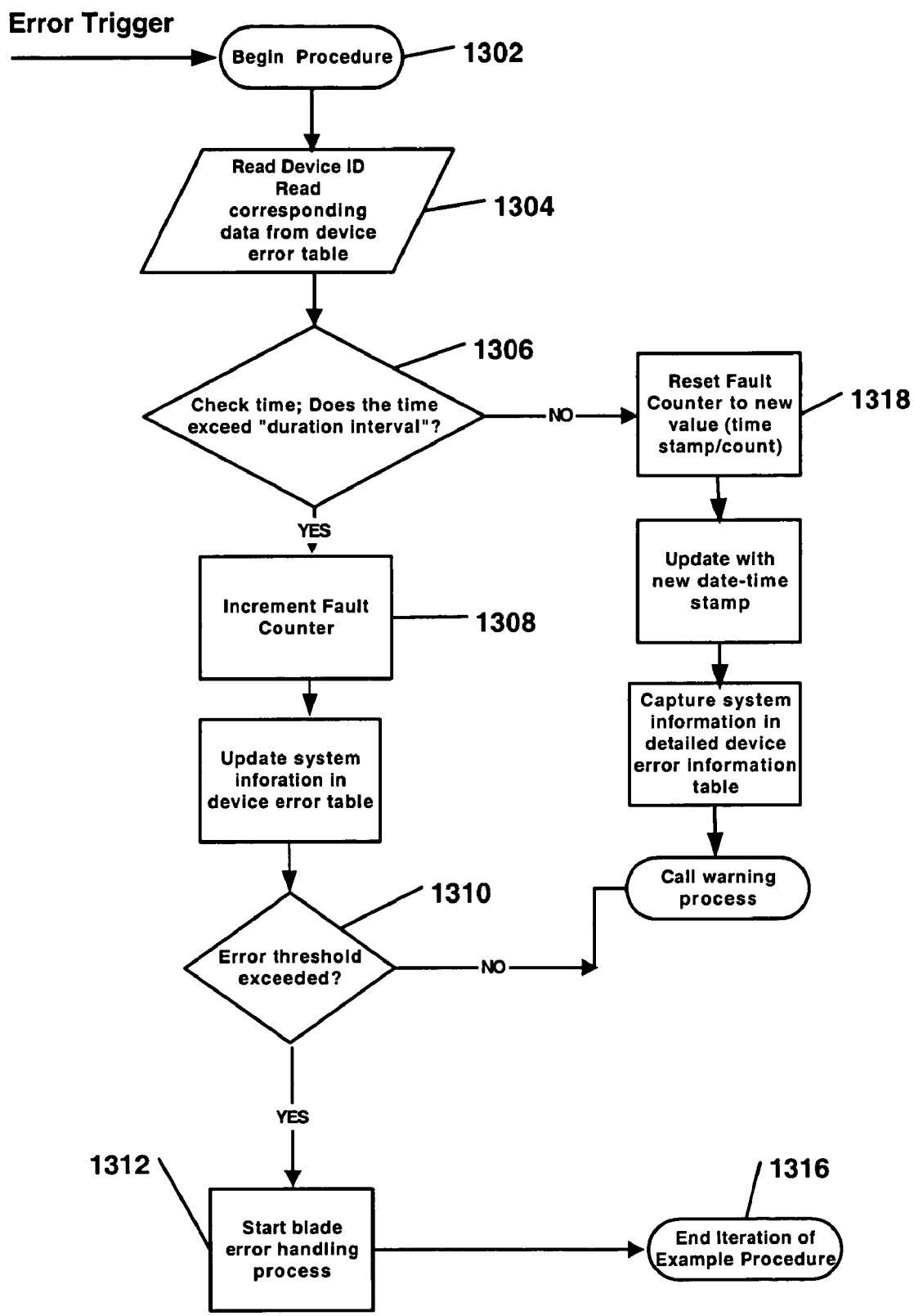
FIG. 8 illustrates a second example procedure for fault diagnosis and prediction for a memory component, according to a second example embodiment of the present invention.

FIG. 8 illustrates a second example procedure for fault diagnosis and prediction for a memory component, according to an alternative example embodiment of the present invention. The example procedure is described in terms of memory fault analysis, but other component types could have similar procedures. The example procedure may executed by the diagnosis processor, the satellite diagnosis processor, both processors in combination, or by some other system element. It will be appreciated that the example procedure may be carried out by executing a series of instructions stored on a computer-readable medium. The series of instructions may be stored on CD-ROM, disk, tape, as microcode or in firmware, or any other computer-readable medium.

An iteration of the example procedure begins with 1302. The example procedure may be executed periodically, e.g., at regular time intervals, or may be event triggered, e.g., run when an fault-related interrupt occurs during a memory read or write, or whenever a parity error is detected. It will be appreciated that the frequency of execution may be varied as a function of the state of the system, e.g., reduced with increasing work load, or increased when more faults have been detected.

In 1304, fault data from a component may be read, e.g., by a satellite diagnosis processor. It will be appreciated that, depending on the particular hardware implementation employed, fault data may also be read directly by a the diagnosis processor. The fault data may be read in any conventional fashion, e.g., by reading the component fault register.

In 1306, the fault data may be checked to determine if a new fault has occurred. If a new fault has been detected, the example procedure may continue with 1308. Note the new fault may actually have been successfully corrected and masked by the component, so that other than the information contained in the fault register, the fault may be invisible to the system as a whole. If no new fault has occurred, the example procedure may continue with 1318.

In 1308, a leaky bucket fault counter for the component may be incremented. Other fields in the fault information table for the component may also be updated.

In 1310, if the leaky bucket fault counter for the component is tested to determine if the counter has exceeded a predetermined threshold. If the counter has exceeded the predetermined threshold, the example procedure may take corrective action, continuing with 1312. If the threshold has not been exceeded, the example procedure may continue with 1318.

In 1312, corrective action may be initiated. For example, an alert may be sent to the operating system. Corrective action continues. For example, the faulty memory location may be disabled.

The example procedure ends with 1316. The procedure may continue for other components, or when other faults are detected in the system.

In 1318, the leaky bucket fault counter predetermined threshold has not been exceeded. The system may wait, either for a predetermined interval, or, if the procedure is event driven, until another fault occurs.

While waiting, in 1320, the fault data for the component may be aged, for example by periodically decrementing the fault counter. The procedure may continue with 1304 after another fault occurs, or after a predetermined waiting interval has passed.

Modifications

In the preceding specification, the present invention has been described with reference to specific example embodiments thereof. It will, however, be evident that various modifications and changes may be made thereunto without departing from the broader spirit and scope of the present invention as set forth in the claims that follow. The specification and drawings are accordingly to be regarded in an illustrative rather than restrictive sense.

The invention claimed is:

1. A system, comprising:
a fault table configured to receive fault information associated with a component and a time value associated with the fault information; and
a diagnosis processor configured to read the fault information from the fault table and initiate corrective action as a function of the fault information and the time value associated with the fault information before a failure of the component occurs, said diagnosis processor further to remove the fault information from the fault table when the time value associated with the fault information indicates that the fault information is older than a predetermined threshold.

2. The system of claim 1, wherein the fault table is contained in the diagnosis processor.

3. The system of claim 1, wherein the fault table is contained outside the diagnosis processor.

4. The system of claim 1, wherein the fault table includes an entry, said entry including a field indicative of the identity of the component.

5. The system of claim 1, wherein the time value is indicative of when a fault was detected in the component.

6. The system of claim 1, wherein the time value is indicative of the time that has elapsed since a fault was detected in the component.

7. The system of claim 1, wherein the fault table includes an entry, said entry including information indicative of the nature of a fault that has been detected in the component.

8. The system of claim 1, wherein the table includes an entry, said entry including a leaky bucket fault counter.

9. The system of claim 1, wherein the diagnosis processor is to predict a failure of the component.

10. The system of claim 1, wherein the component includes a fault register, and the fault information includes a value read from the fault register.

11. A method for handling faults in a system, comprising:
receiving fault information associated with a component;
storing the fault information in a fault information table;
storing a time value associated with the fault information in the fault information table;
taking corrective action as a function of the fault information and the time value associated with the fault information before a failure of the component occurs; and
removing the fault information from the fault information table when the time value associated with the fault information indicates the fault information is older than a predetermined threshold.

12. The method of claim 11, further comprising: predicting the likelihood of failure of the component based on the fault information in the fault information table.

13. The method of claim 12 wherein predicting the likelihood of failure of the component is also based on a policy.

14. The method of claim 12 wherein predicting the likelihood of failure of the component is based on whether more than a predetermined number of faults in a given time window has occurred.

15. The method of claim 14, further comprising modifying the time window based on a frequency of faults in said component.

16. An article of manufacture comprising a computer-readable medium having stored thereon instructions adapted to be executed by a processor, the instructions which, when executed, define a series of steps to be used to control a method for handling faults in a system, said steps comprising:
receiving fault information associated with a component;
storing the fault information in a fault information table;
storing a time value associated with the fault information in the fault information table;

taking corrective action as a function of the fault information and the time value associated with the fault information before a failure of the component occurs; and removing the fault information from the fault information table when the time value associated with the fault information indicates the fault information is older than a predetermined threshold.

17. The article of manufacture of claim 16, wherein said steps further comprise:

predicting the likelihood of failure of the component based on the fault information in the fault information table.

* * * * *

UNITED STATES PATENT AND TRADEMARK OFFICE
CERTIFICATE OF CORRECTION

PATENT NO.         : 7,774,651 B2                                        Page 1 of 1
APPLICATION NO.    : 11/970029
DATED              : August 10, 2010
INVENTOR(S)        : Udayan Mukherjee and Aniruddha Kundu It is certified that error appears in the above-identified patent and that said Letters Patent is hereby corrected as shown below:

Column 14:
Line 25, "the table" should be --the fault table--.

Signed and Sealed this

Second Day of November, 2010

David J. Kappos
*Director of the United States Patent and Trademark Office*